US012763667B2

(12) United States Patent
Song

(10) Patent No.: US 12,763,667 B2
(45) Date of Patent: Oct. 13, 2026

(54) TWO-PHASE DUAL-ACTIVE-BRIDGE DC-DC CONVERTER WITH WIDE INPUT RANGE

(71) Applicant: Murata Manufacturing Co., Ltd., Nagaokakyo (JP)

(72) Inventor: Wei Song, Westborough, MA (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 188 days.

(21) Appl. No.: 18/422,397

(22) Filed: Jan. 25, 2024

(65) Prior Publication Data

US 2024/0266947 A1 Aug. 8, 2024

Related U.S. Application Data

(60) Provisional application No. 63/443,747, filed on Feb. 7, 2023.

(51) Int. Cl.
*H02M 3/335* (2006.01)
*H02M 1/32* (2007.01)

(52) U.S. Cl.
CPC ......... *H02M 1/32* (2013.01); *H02M 3/33573* (2021.05); *H02M 3/33576* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,087,818 A * 7/2000 Hughes .................... H01F 27/04 323/356
6,574,125 B2 6/2003 Matsukawa et al.
(Continued)

FOREIGN PATENT DOCUMENTS

EP 3817207 A1 * 5/2021 ........ H02M 3/33576

OTHER PUBLICATIONS

Official Communication issued in corresponding German Patent Application No. 10 2024 102 129.2, mailed on Mar. 20, 2026, 5 pages.

(Continued)

*Primary Examiner* — Crystal L Hammond
*Assistant Examiner* — Nusrat Quddus
(74) *Attorney, Agent, or Firm* — Keating & Bennett, LLP

(57) ABSTRACT

A two-phase dual-active-bridge (DAB) converter includes a first phase arranged as a first DAB converter, including a first transformer with a first primary winding, and including a first primary circuit connected to the first primary winding; a second phase connected in parallel with the first phase, arranged as a second DAB converter, including a second transformer with a second primary winding, and including a second primary circuit connected to the second primary winding; and a bi-directional switch connected between the first and second primary windings. In a first input voltage range, the bi-directional switch disconnects the first and the second primary windings, and the second primary circuit is operated with a phase shift with respect to the first primary circuit; and in a second input voltage range, the bi-directional switch connects the first and the second primary windings in series, and the first and the second primary circuits are operated as a single DAB converter.

7 Claims, 9 Drawing Sheets

FIG. 1A
FIG. 1B

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/073; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/04; H02M 7/00; H02M 3/22; H02M 1/08; H02M 1/36; H02M 3/24; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H05B 39/048; B23K 11/24; H04B 2215/069; Y02B 70/1491

See application file for complete search history.

(56) References Cited

U.S. PATENT DOCUMENTS

| | | | | |
|---|---|---|---|---|
| 7,710,097 | B2 * | 5/2010 | Makino | H02J 9/005 323/346 |
| 8,970,161 | B1 * | 3/2015 | Cuadros | H02M 3/33584 320/140 |
| 10,263,456 | B1 * | 4/2019 | Wang | H02J 9/06 |
| 11,394,309 | B2 * | 7/2022 | Hoole | H02M 5/12 |
| 2015/0349649 | A1 * | 12/2015 | Zane | H02M 3/33507 363/21.03 |
| 2016/0020016 | A1 * | 1/2016 | Ouyang | H01F 27/34 363/21.04 |
| 2020/0204676 | A1 * | 6/2020 | Chiang | H04M 3/2227 |
| 2021/0367521 | A1 * | 11/2021 | Sakai | H02M 3/33584 |
| 2022/0166343 | A1 * | 5/2022 | Zhang | H02M 1/325 |
| 2024/0186908 | A1 * | 6/2024 | Pan | H02M 3/01 |
| 2024/0339934 | A1 * | 10/2024 | Zhang | H02M 3/33584 |
| 2025/0158518 | A1 * | 5/2025 | Xu | H02M 3/33573 |

OTHER PUBLICATIONS

Apte et al., “Configurable ISOP-IPOP DC-DC Converter for Universal Solid-State Transformer”, European Power Electronics and Drives Association and the Institute of Electrical and Electronics Engineers (IEEE), EPE’22 ECCE Europe, pp. 1-8.

* cited by examiner

TWO-PHASE DUAL-ACTIVE-BRIDGE DC-DC CONVERTER WITH WIDE INPUT RANGE

CROSS REFERENCE TO RELATED APPLICATIONS

This application claims the benefit of U.S. Patent Application No. 63/443,747 filed on Feb. 7, 2023. The entire contents of this application are hereby incorporated by reference.

BACKGROUND OF THE INVENTION

1. Field of the Invention

The present invention relates to DC-DC converters. More specifically, the present invention relates to two-phase dual active bridge (TP-DAB) DC-DC converters.

2. Description of the Related Art

Due to an explosive growth in renewable energy sources, dual active bridge (DAB) power conversion topology has gained significant interest. Single-phase DAB DC-DC converters include a high-voltage (HV) H-bridge and a low-voltage (LV) H-bridge connected by a transformer and include an inductor L connected between the HV H-bridge and the transformer.

The DAB topology provides bidirectional power flow, has a wide voltage conversion gain range, and can provide zero voltage switching (ZVS) capability with proper control under certain operating conditions. However, DAB converters are not particularly suited for high-current applications with a wide voltage range because, in such situations, DAB topology can suffer from large circulating, high peak, and subsequently large root-mean-square (RMS) current.

SUMMARY OF THE INVENTION

To overcome the problems described above, example embodiments of the present invention provide two-phase dual-active-bridge converters that can be operated in a first mode in which primary-side circuits of the two phases of the converters are operated out of phase with each other and that can be operated in a second mode in which the phases are operated as a single phase. Secondary-side circuits of the two phases can be operated synchronously with each other. In the second mode, e.g., a high-input-voltage mode, a bi-directional switch can be used to connect the primary windings of the two phases in series with each other.

According to an example embodiment of the present invention, a two-phase dual-active-bridge (DAB) converter includes a first phase arranged as a first DAB converter, including a first transformer with a first primary winding, and including a first primary circuit connected to the first primary winding; a second phase connected in parallel with the first phase, arranged as a second DAB converter, including a second transformer with a second primary winding, and including a second primary circuit connected to the second primary winding; and a bi-directional switch connected between the first and the second primary windings. In a first input voltage range, the bi-directional switch disconnects the first and the second primary windings, and the second primary circuit is operated with a phase shift with respect to the first primary circuit; and in a second input voltage range, the bi-directional switch connects the first and the second primary windings in series, and the first and the second primary circuits are operated as a single DAB converter.

The phase shift can be T/4, where T is the switching period of the two-phase DAB converter. The two-phase DAB converter can further include a first secondary circuit connected to a first secondary winding of the first transformer and a second secondary circuit connected to a second secondary winding of the second transformer, wherein the first and the second secondary circuits can be synchronously operated in both the first and the second input voltage ranges.

According to an example embodiment of the present invention, a converter includes first and second high-voltage (HV) terminals, first and second low-voltage (LV) terminals, a first phase, a second phase, and a switch connected between the first primary winding and the second primary winding. The first phase includes a first transformer including a first primary winding and a first secondary winding, first and second HV legs arranged in an H-bridge and connected between the first and the second HV terminals and the first primary winding, and first and second LV legs arranged in an H-bridge and connected between the first secondary winding and the first and second LV terminals. The second phase includes a second transformer including a second primary winding and a second secondary winding, first and second HV legs arranged in an H-bridge and connected between the first and the second HV terminals and the second primary winding, and first and second LV legs arranged in an H-bridge and connected between the second secondary winding and the first and second LV terminals. The switch connects and disconnects the first and the second primary windings in series.

In a first input voltage range, the switch can disconnect the first and the second primary windings, and the second phase can be operated with a phase shift with respect to the first phase; and in a second input voltage range, the switch can connects in series the first and the second primary windings, the second HV leg of the first phase and the first HV leg of the second phase can be off, and the first HV leg of the first phase and the second HV leg of the second phase can be operated as a single phase. The phase shift can be T/4, where T is the switching period of the converter. In both the first and the second input voltage ranges, the first and the second LV legs of the first phase can be synchronously operated with the first and the second LV legs of the second phase.

The above and other features, elements, characteristics, steps, and advantages of the present invention will become more apparent from the following detailed description of example embodiments of the present invention with reference to the attached drawings.

DETAILED DESCRIPTION OF EXAMPLE EMBODIMENTS

Figures 1A, 1B:
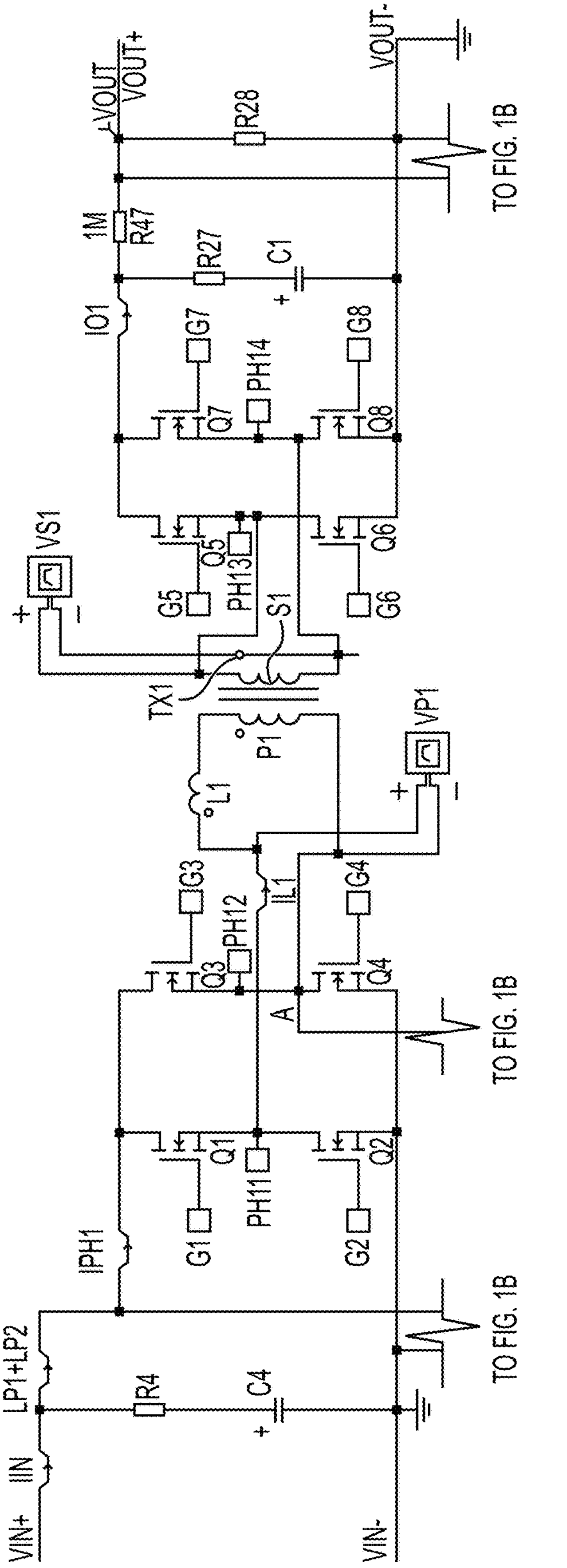
FIGS. 1A and 1B show a circuit diagram of a two-phase dual-active-bridge DC-DC converter.
Figure 1B:
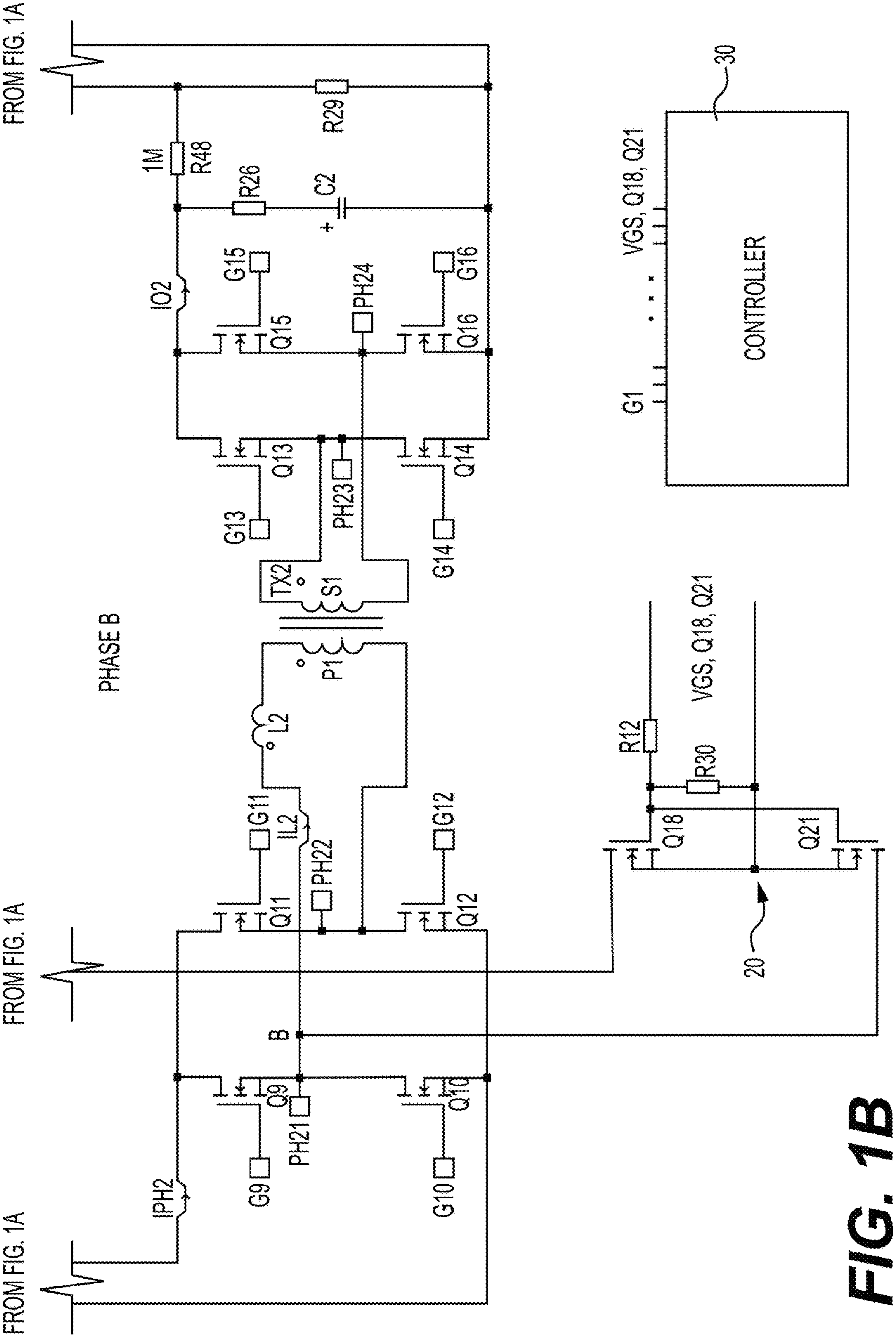
Figure 2A:
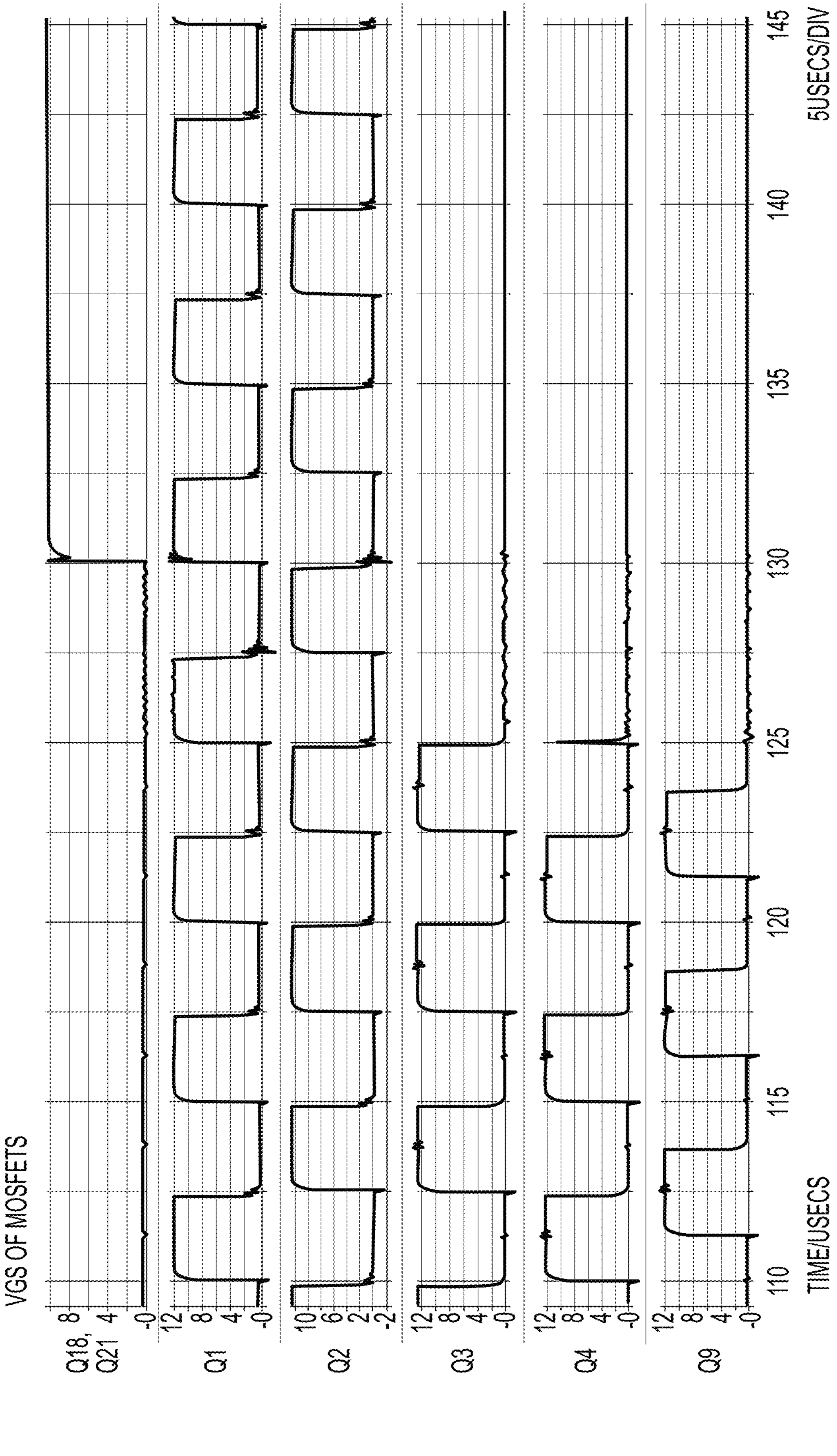
FIGS. 2A, 2B, 3A, and 3B show waveforms of the two-phase dual-active-bridge DC-DC converter of FIGS. 1A and 1B.
Figure 2B:
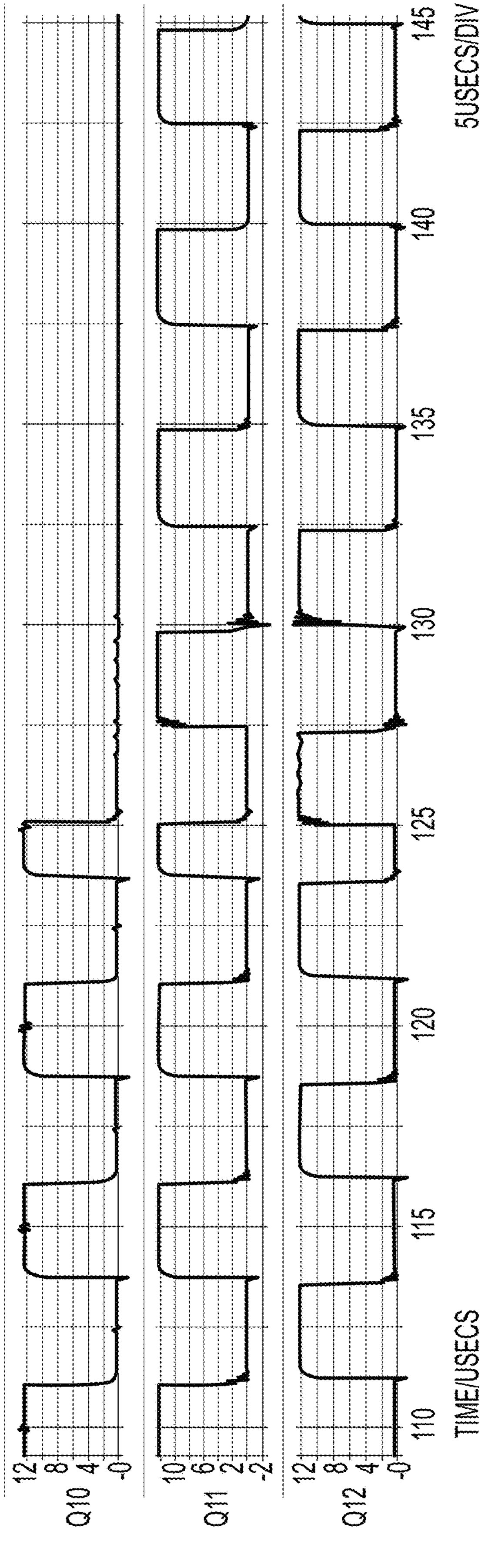
Figure 3A:
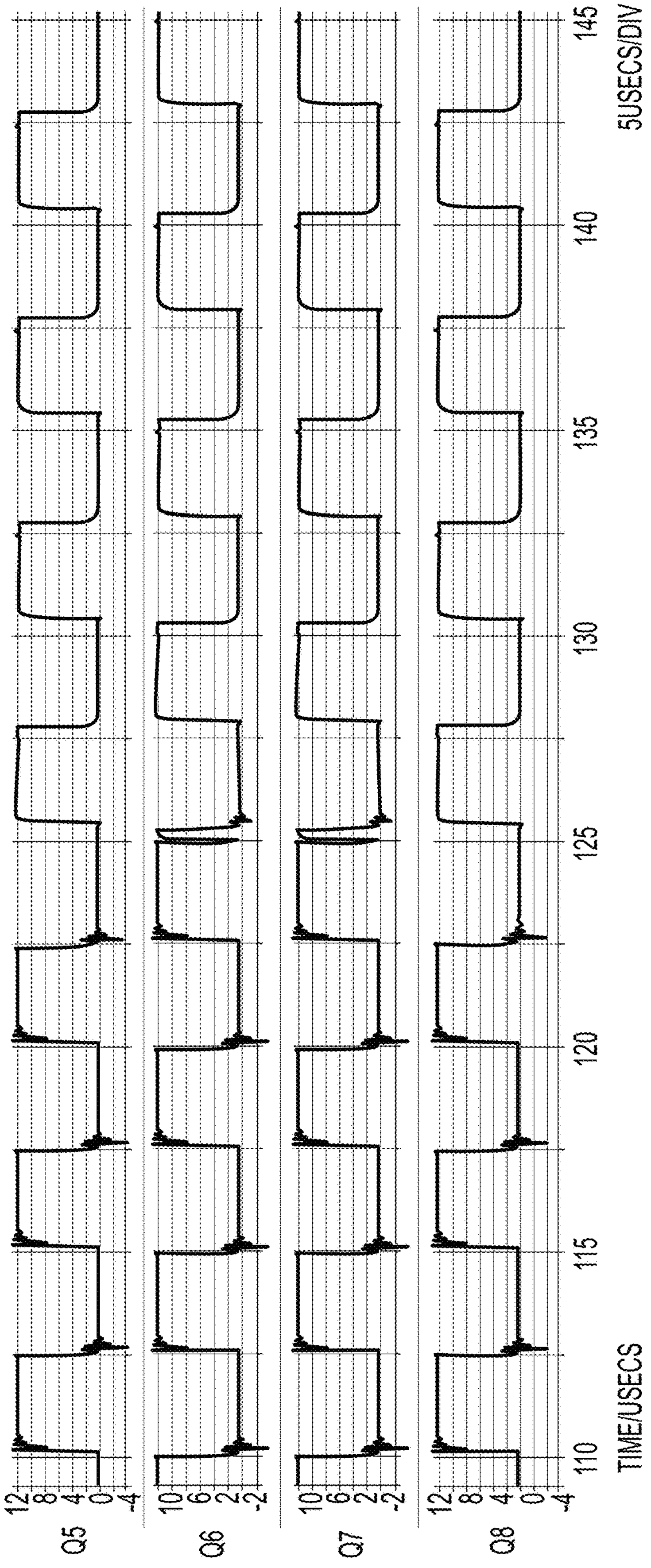
Figure 3B:
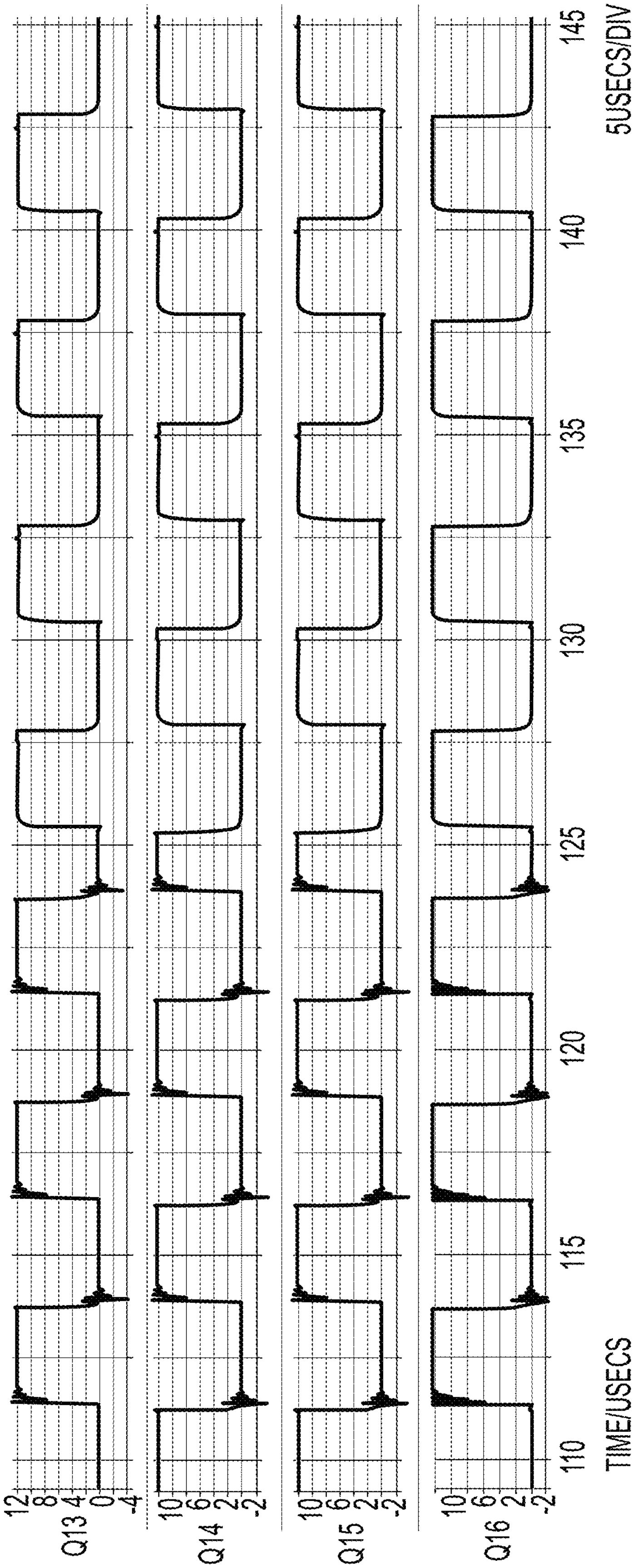

FIGS. 1A and 1B show a circuit diagram of a converter 10 that is a two-phase dual-active-bridge (TP-DAB) DC-DC converter. FIGS. 1A and 1B show a circuit diagram that can be used in a simulator to simulate the operation of the converter 10, and as such, FIGS. 1A and 1B include elements that may not be present in an actual converter 10. The converter 10 can include two phases, phase A and phase B, that are controlled by a controller 30.

As shown in FIGS. 1A and 1B, each of phases A and B of the converter 10 can have a dual active bridge (DAB) topology with a high-voltage (HV) H-bridge and a low-voltage (LV) H-bridge connected by a transformer TX1 or TX2 and can include an inductor L1 or L2 connected between the HV H-bridge and the transformer TX1 or TX2. Inductors L1 and L2 can be the leakage inductance of TX1 and TX2 or can be individual inductors. Each of the transformers TX1, TX2 can include a primary winding P1 and a secondary winding S1. The side of phase A or B with the HV H-bridge can be referred to as the HV side or the primary side, and the side of phase A or B with the LV H-bridge can be referred to as the LV side or the secondary side. The HV H-bridge includes two legs on the HV side of the transformer TX1 or TX2, and the LV H-bridge includes two legs on the LV side of the transformer TX1 or TX2.

The converter 10 can include two terminals on the HV side and two terminals on the LV side. It should be understood that the HV side can be either the input side or the output side and the LV side can be either the output side or the input side.

FIGS. 1A and 1B show a capacitor C4 and a resistor R4 connected in series across the HV side terminals Vin+, Vin−. The capacitor C4 can be an input capacitor, and the resistor R4 can represent the equivalent series resistance (ESR) of the capacitor C4. The capacitor C4 and the resistor R4 are optional and can be omitted. If the capacitor C4 is included, then it is possible to omit the resistor R4. The current probe IIN can be used to measure the input current and can be omitted. The current probe Ip1+Ip2 can be used to measure the total current in phases A and B and can be omitted.

FIGS. 1A and 1B show that the switches Q1 and Q2 define a first HV leg of phase A and the switches Q3 and Q4 define a second HV leg of phase A and that the switches Q5 and Q6 define a first LV leg of phase A and the switches Q7 and Q8 define a second LV leg of phase A. The current probe IPH1 can be used to measure the current on the HV side of phase A and can be omitted. The current probe IL1 can be used be used to measure the current in the inductor L1 and can be omitted. The current probe IO1 can be used to measure the current on the LV side of phase A and can be omitted. The voltage probe VP1 can be used to measure the voltage across the inductor L1 and the primary winding P1 and can be omitted. The voltage probe VS1 can be used to measure the voltage across the secondary winding S1 and can be omitted. The terminals PH11, PH12, PH13, PH14 can be used to label different connections in the circuit and can be omitted. Capacitor C1 can be an output capacitor and can be omitted. The resistor R27 can represent the ESR of the capacitor C1 and can be omitted. If the capacitor C1 is included, then it is possible to omit the resistor R27. The resistor R47 can represent the resistances of the wires of the circuit and can be omitted. The resistor R28 can represent the load at the LV terminals Vout+, Vout−.

FIGS. 1A and 1B show that the switches Q9 and Q10 define a first HV leg of phase B and the switches Q11 and Q12 define a second HV leg of phase B and that the switches Q13 and Q14 define a first LV leg of phase B and the switches Q15 and Q16 define a second LV leg of phase B. The current probe IPH2 can be used to measure the current on the HV side of phase B and can be omitted. The current probe IL2 can be used be used to measure the current in the inductor L2 and can be omitted. The current probe IO2 can be used to measure the current on the LV side of phase B and can be omitted. The terminals PH21, PH22, PH23, PH24 can be used to label different connections in the circuit and can be omitted. Capacitor C2 can be an output capacitor and can be omitted. The resistor R26 can represent the ESR of the capacitor C2 and can be omitted. If the capacitor C2 is included, then it is possible to omit the resistor R26. The resistor R48 can represent the resistances of the wires of the circuit and can be omitted. The resistor R29 can represent the load at the LV terminals Vout+, Vout−.

Controlling the switches Q1-Q8 in phase A determines the direction of power flow and the voltage gain in phase A, and controlling the switches Q9-Q16 in phase B determines the direction of power flow and the voltage gain in phase B. In each leg, only one of the two switches is on at a time, and the two switches in the leg can be complementarily controlled with a dead time, i.e., when the two switches in the leg are both turned off. Switches Q1-Q16 can be any suitable transistor, including, for example, metal-oxide-semiconductor field-effect transistor (MOSFETs).

The transformers TX1, TX2 can have a turns ratio of N:1. In FIGS. 1A and 1B, the primary winding P1 of the transformer TX1 is connected to a corresponding first HV node between switches Q1 and Q2 and near the terminal PH11 and to a second HV node between switches Q3 and Q4 and near the terminal PH12. An inductor L1 is connected between the first HV node and the primary winding P1 of the transformer TX1. The secondary winding S1 of transformer TX1 is connected to a first LV node between switches Q5 and Q6 and near terminal PH13 and to a second LV node between switches Q7 and Q8 and near terminal PH14. And in FIGS. 1A and 1B, the primary winding P1 of the transformer TX2 is connected to a corresponding first HV node between switches Q9 and Q10 and near terminal PH21 and to a second HV node between switches Q11 and Q12 and near terminal PH22. An inductor L2 is connected between the first HV node and the primary winding P1 of the transformer TX2. The secondary winding S1 of transformer TX2 is connected to a first LV node between switches Q13 and Q14 and near terminal PH23 and to a second LV node between switches Q15 and Q16 and near terminal PH24.

The controller 30 can provide gate signals G1, . . . , G16 to the respective transistors Q1, . . . , Q16. Any suitable controller can be used as the controller, including, for example, an integrated circuit, an application-specific integrated circuit, etc. The controller 30 can monitor the output voltage, either at the terminal Vin+ or the terminal Vout+ depending on the direction of the current flow. The controller 30 can monitor voltages at the HV side terminals Vin+, Vin− and at the LV side terminals Vout+, Vout−, currents at the current probes IPH1 and Io1 in Phase A, and currents at the probes IPH2 and Io2 in Phase B and can generate all signals to drive the switches Q1-Q16. The controller 30 can operate the converter 10 in a first mode and a second mode. For example, the first and the second modes can be a low-input-voltage mode and a high-input-voltage mode. For example, if the input voltage is between about 18 V and about 36 V, then the converter 10 can be operated in the first mode or the low-input-voltage mode, and if the input voltage is between about 36 V and about 75 V, then the converter 10 can be operated in the second mode or the high-input-voltage mode. The first input-voltage range (the low-input-voltage range) of about 18 V—about 36 V and the second input-voltage range (high-input-voltage range) of about 36 V—about 75 V are examples only, and other voltage ranges could be used.

A bi-directional switch 20 that includes the switches Q18 and Q21 can be connected between the primary winding P1 of phase A and the primary winding P1 of phase B. The switches Q18 and Q21 are connected in series. One end of the bi-directional switch 20 can be connected to the second HV node of phase A, and the other end of the bi-directional switch 20 can be connected to the first HV node of phase B. The switch Q18 can be connected to node A in Phase A, and the switch Q21 can be connected to node B in Phase B. The bi-directional switch 20 can be controlled by the controller 30 using the control signal VGS,Q18,Q21. A transient-control circuit can be connected to the bi-directional switch 20. For example, the transient-control circuit can include resistor R12 connected between the gate of switch Q18 and the controller 30 and can include resistor R30 connected in parallel across the gate of switch Q18 and the node between the switches Q18, Q21 connected to the sources of the switches Q18, Q21. The bi-directional switch 20 can connect in series and disconnect the primary winding P1 of the transformer TX1 and the primary winding P1 of the transformer TX2. For example, when the bi-directional switch 20 is turned on, the primary winding P1 of the transformer TX1 and the primary winding P1 of the transformer TX2 can be connected in series, and when the bi-directional switch 20 is turned off, the primary winding P1 of the transformer TX1 and the primary winding P1 of the transformer TX2 can be disconnected.

In low-input-voltage mode, the bidirectional switch 20 can be off, i.e., the transistors Q18 and Q21 can be off, and the controller 30 can control the primary-side circuit including switches Q9-Q12 in phase B with a T/4 delay, where T is the switching period of the converter 10, with respect to the primary-side circuit including switches Q1-Q4 in phase A.

In high-input-voltage mode, the bidirectional switch 20 can be used to connect the primary winding P1 of phase A and the primary winding P1 of phase B in series so that the phase A and phase B can be operated as single-phase DAB converter. The operating primary voltage of the converter 10 can equal to half of the input voltage on the HV terminals. The secondary sides of Phase A and Phase B can be operated synchronously. For example, the transistors Q5 and Q13, transistors Q6 and Q14, transistors Q7 and Q15, transistors Q8 and Q16 can be controlled with the same set of control signals.

In both the low-input-voltage mode and the high-input-voltage mode, the secondary-side circuit including switches Q5-Q8 in phase A and the secondary-side circuit including switches Q13-Q16 in phase B can be synchronously operated.

FIGS. 2A, 2B, 3A, and 3B show waveforms of control signals of the converter 10 in the two operating modes. The control is implemented with a phase shift between phase A, which can be the primary bridge, and phase B, which can be the secondary bridge, while phases A and B are both operated with a fixed duty ratio close to 50% duty ratio (with proper dead time to prevent from shoot-through current).

Between t=110 μs and t=125 μs, the converter 10 is operated in the first mode or the low-input-voltage mode. The switches Q1, Q2 and the switches Q3, Q4 in phase A can be complimentarily controlled, e.g., when switches Q1, Q4 are on, switches Q2, Q3 are off and when switches Q1, Q4 are off, switches Q2, Q2 are on. The switches Q9, Q12 and the switches Q10, Q11 in phase B can be complimentarily controlled but with a T/4 phase shift, where T is the switching period, with respect to the switches Q1-Q4. The switches Q5, Q8 and the switches Q6, Q7 in phase A can be complimentarily controlled, e.g., when switches Q5, Q8 are on, switches Q6, Q7 are off and when switches Q5, Q8 are off, switches Q6, Q7 are on. The switches Q13, Q16 and the switches Q14, Q15 in phase B can be complimentarily controlled, and the switches Q13-Q16 can be synchronously controlled, i.e., without a phase shift, with switches Q5-Q8.

Before the converter 10 changes from the first mode to a second mode or a high-input-voltage mode at t=130 μs, switches Q3, Q4, Q9, and Q10 are turned off between t=125 μs and t=130 μs to smooth the mode-change process. At t=130 μs at the beginning of the second mode, switches Q18 and Q21 are turned on so that the primary winding P1 of transformers TX1, TX2 are connected in series.

Between t=130 μs and t=145 μs, the converter 10 is operated in the second mode or the high-input-voltage mode. To operate phases A and B as a single phase, the first HV leg of phase A and the second HV leg of phase B can be operated together as full H-bridge of a single phase. The switches Q3, Q4, Q9, Q10 are turned off, and the switches Q1, Q2 in phase A and switches Q11, Q12 in phase B can be complimentarily controlled, i.e., when switches Q1, Q12 are on, switches Q2, Q11 are off and when switches Q1, Q12 are off, switches Q2, Q11 are on. The switches Q5, Q6 and switches Q7, Q8 in phase A can be complimentarily controlled, i.e., when switches Q5, Q6 are on, switches Q7, Q8 are off and when switches Q5, Q6 are off, switches Q7, Q8 are on. The switches Q13, Q16 and switches Q14, Q15 in phase B can be complimentarily controlled, and, as in the low-input-voltage mode, the switches Q13-Q16 can be synchronously controlled, i.e., without a phase shift, with switches Q5-Q8.

Figure 4A:
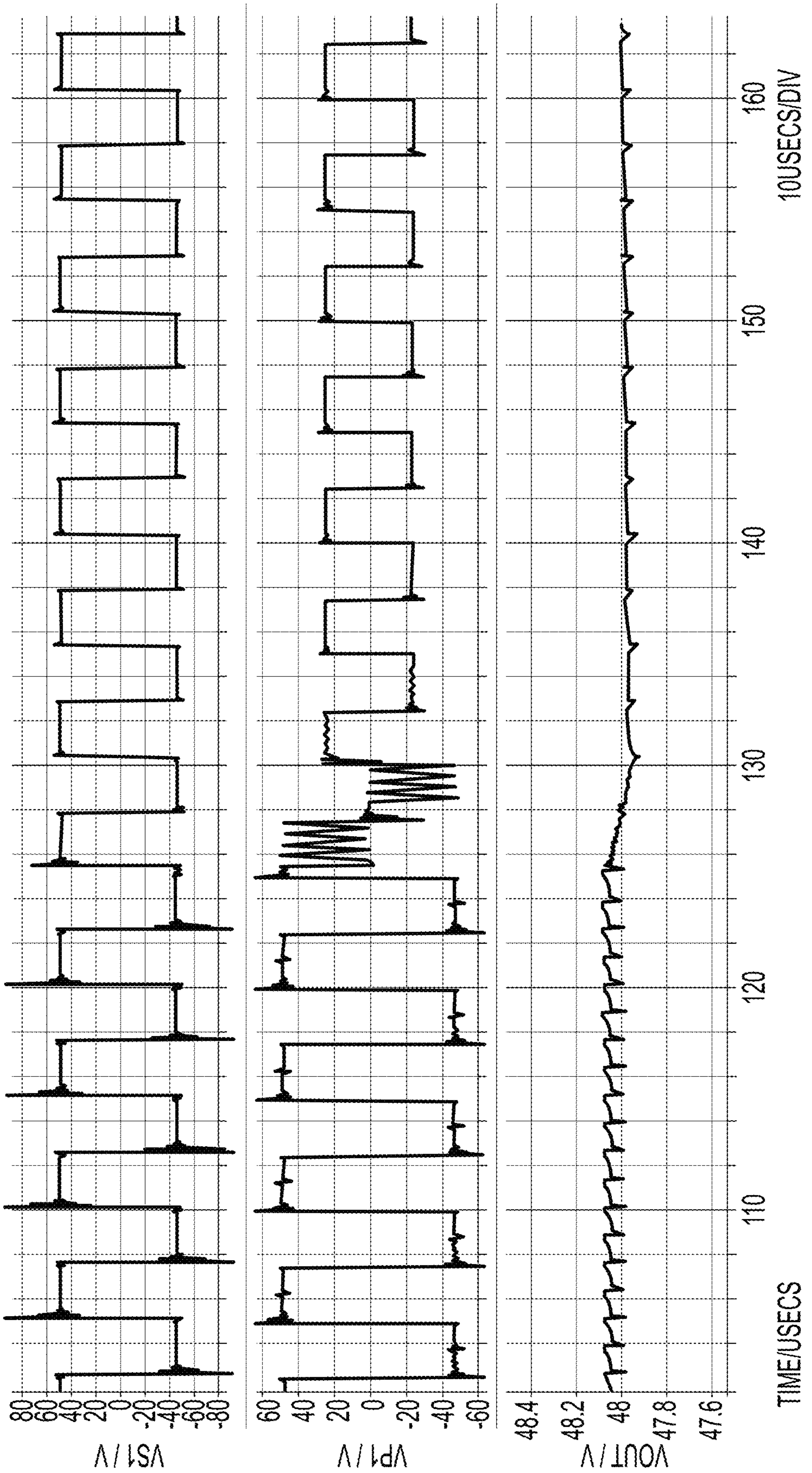
FIGS. 4A, 4B, and 5 show waveforms of two operation modes of the two-phase dual-active-bridge DC-DC converter of FIGS. 1A and 1B.
Figure 4B:
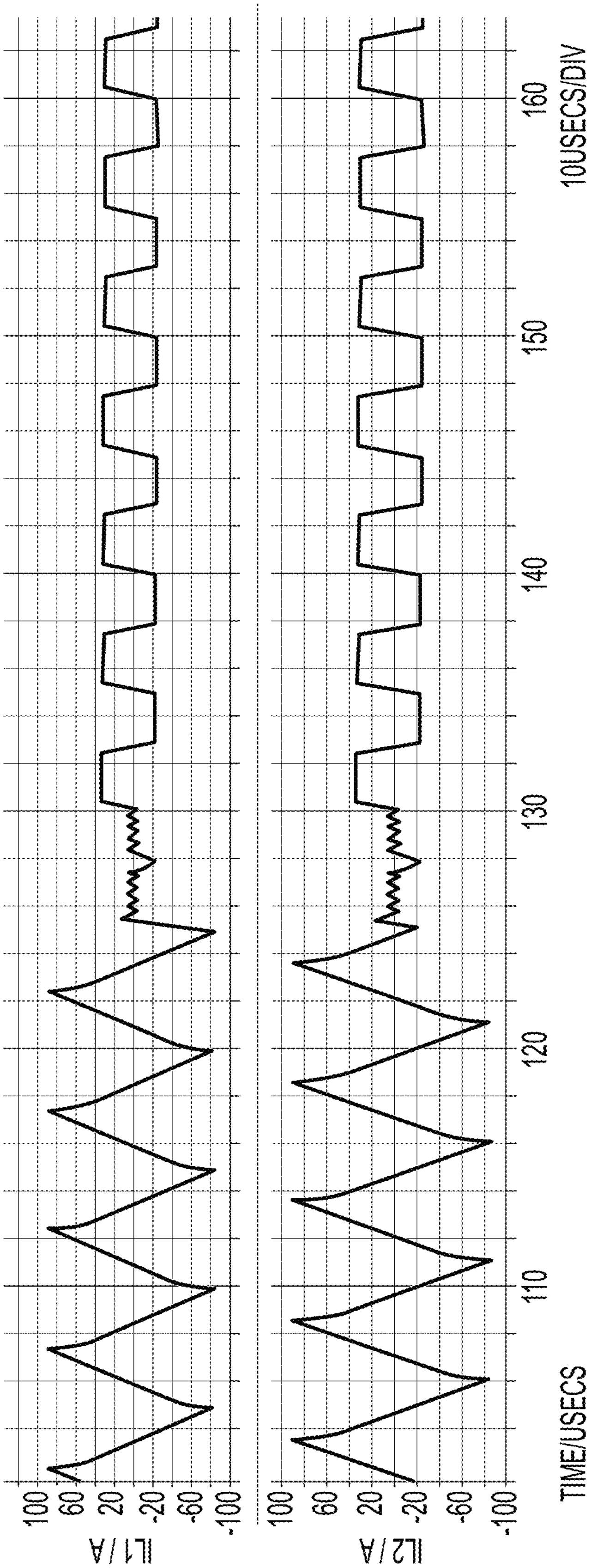
Figure 5:
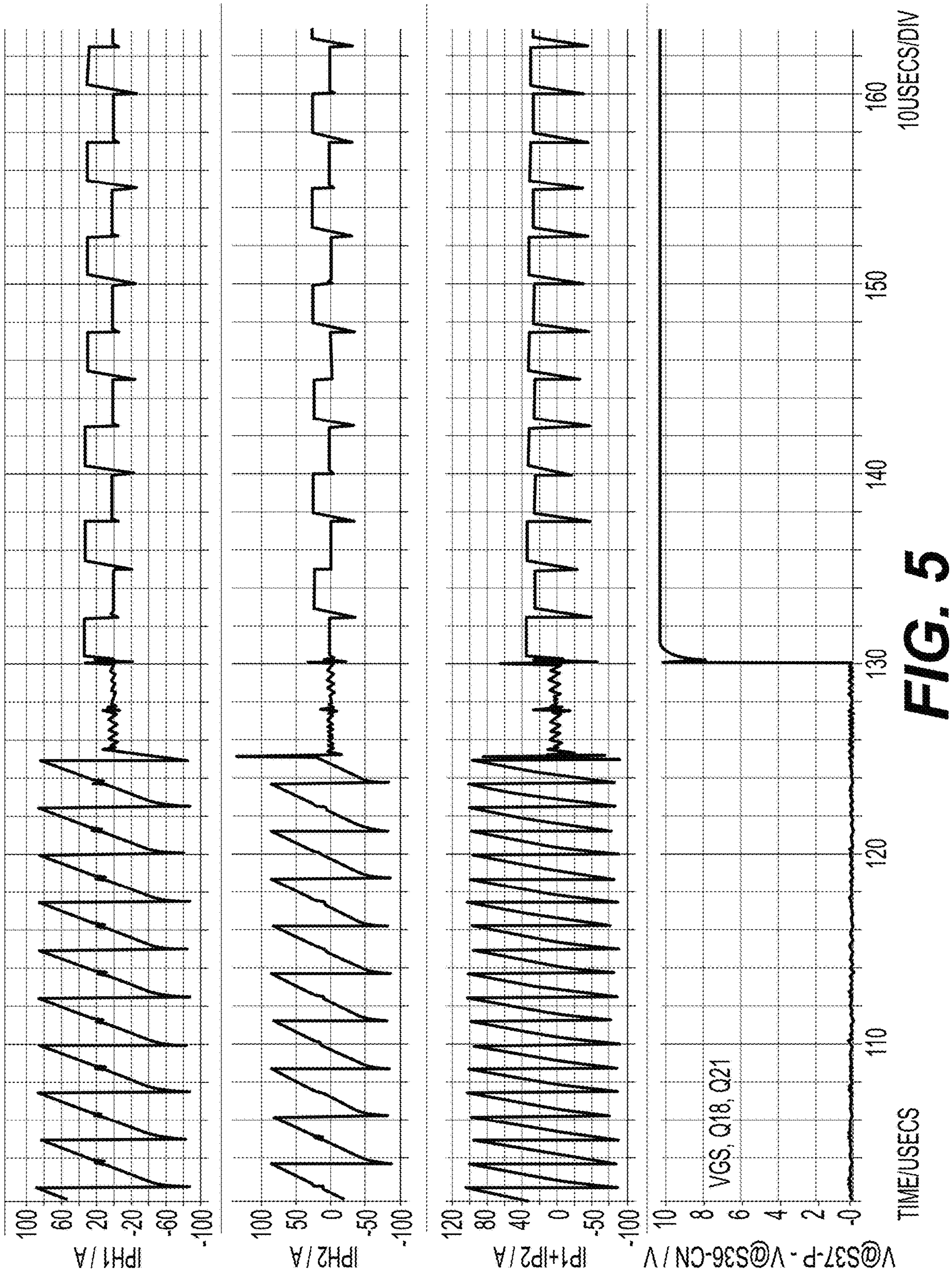

FIGS. 4A, 4B, and 5 show waveforms of the secondary winding voltage VS1 of phase A, the transformer primary winding voltage VP1 of phase A, the output voltage Vout, the inductor current IL1 of phase A, the inductor current IL2 of phase B, the phase A input current IPH1, the phase B input current IPH2, the sum of phases A and B current Ip1+Ip2, and the control signal VGS,Q18,Q21. The waveforms in FIGS. 4A, 4B, and 5 are based on a converter with an input voltage of 48 V an output voltage of 48 V, and an output power of 1 kW. FIGS. 4A, 4B, and 5 show operation of the converter 10 at a constant input voltage of 48 V to show the difference in the ripple current in the first and the second modes. It should be understood that these specific numerical values are only examples and that other values can be used. Comparing the waveforms before and after t=125 μs, it can be seen that the peak and RMS values of the primary currents IL1, IL2 are significantly reduced when operating at high-input-voltage mode with the primary windings P1 of the transformers TX1, TX2 connected in series.

Single direction TP-DAB is discussed above in which power flows from the HV side to the LV side, but a bi-directional TP-DAB could also be used in which power can flow from the HV side to the LV side and can flow from the LV side to the HV side. In addition, instead of the dual-phase converter, a multiphase converter with more than two phases could also be used in very wide range input voltage applications.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A two-phase dual-active-bridge (DAB) converter comprising:

a first phase arranged as a first DAB converter, including a first transformer with a first primary winding, and including a first primary circuit connected to the first primary winding;

a second phase connected in parallel with the first phase, arranged as a second DAB converter, including a second transformer with a second primary winding, and including a second primary circuit connected to the second primary winding; and a bi-directional switch connected between the first and the second primary windings; wherein in a first input voltage range, the bi-directional switch disconnects the first and the second primary windings, and the second primary circuit is operated with a phase shift with respect to the first primary circuit; and in a second input voltage range, the bi-directional switch connects the first and the second primary windings in series, and the first and the second primary circuits are operated as a single DAB converter.

2. The two-phase DAB converter of claim 1, wherein the phase shift is T/4, where T is the switching period of the two-phase DAB converter.

3. The two-phase DAB converter of claim 1, further comprising:

a first secondary circuit connected to a first secondary winding of the first transformer; and a second secondary circuit connected to a second secondary winding of the second transformer; wherein the first and the second secondary circuits are synchronously operated in both the first and the second input voltage ranges.

4. A converter comprising:

first and second high-voltage (HV) terminals;

first and second low-voltage (LV) terminals;

a first phase including:

a first transformer including a first primary winding and a first secondary winding;

first and second HV legs arranged in an H-bridge and connected between the first and the second HV terminals and the first primary winding; and first and second LV legs arranged in an H-bridge and connected between the first secondary winding and the first and second LV terminals;

a second phase including:

a second transformer including a second primary winding and a second secondary winding;

first and second HV legs arranged in an H-bridge and connected between the first and the second HV terminals and the second primary winding; and first and second LV legs arranged in an H-bridge and connected between the second secondary winding and the first and second LV terminals; and a switch connected between the first primary winding and the second primary winding; wherein the switch connects in series and disconnects the first and the second primary windings.

5. The converter of claim 4, wherein in a first input voltage range, the switch disconnects the first and the second primary windings, and the second phase is operated with a phase shift with respect to the first phase; and in a second input voltage range:

the switch connects the first and the second primary windings in series;

the second HV leg of the first phase and the first HV leg of the second phase are off; and the first HV leg of the first phase and the second HV leg of the second phase are operated as a single phase.

6. The converter of claim 5, wherein the phase shift is T/4, where T is the switching period of the converter.

7. The converter of claim 5, wherein, in both the first and the second input voltage ranges, the first and the second LV legs of the first phase are synchronously operated with the first and the second LV legs of the second phase.

* * * * *